US006807850B2

(12) United States Patent
Kalweit et al.

(10) Patent No.: US 6,807,850 B2
(45) **Date of Patent: *Oct. 26, 2004**

(54) METHOD FOR DETERMINING THE TORQUE ON THE CRANKSHAFT OF AN INTERNAL COMBUSTION ENGINE

(75) Inventors: Dieter Kalweit, Schorndorf (DE); Sven Merkle, Stuttgart (DE); Tobias Roulet, Leonberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/955,595

(22) Filed: Sep. 17, 2001

(65) Prior Publication Data

US 2004/0020280 A1 Feb. 5, 2004

(30) Foreign Application Priority Data

Sep. 18, 2000 (DE) ........................................ 100 46 448

(51) Int. Cl.[7] ............................ G01L 3/26; G01L 5/13; G01M 15/00; F02B 17/00

(52) U.S. Cl. ...................................... 73/117.3; 123/295

(58) Field of Search ........................ 73/118.1; 123/295, 123/179.1, 73 C; 701/111

(56) References Cited

U.S. PATENT DOCUMENTS 6,530,358 B2 * 3/2003 Kalweit et al. ............ 123/295

* cited by examiner

*Primary Examiner*—Edward Lefkowitz
*Assistant Examiner*—Octavia Davis
(74) *Attorney, Agent, or Firm*—Klaus J. Bach

(57) ABSTRACT

In a method for determining the torque of the crankshaft of an internal combustion engine, the intake work of the cylinder in the respective working cycle during the intake period, the compression work of the cylinder in the respective working cycle during the compression period, the combustion work of the cylinder in the respective working cycle during the combustion period and the expulsion work of the cylinder in the respective working cycle during the exhaust period are determined, and the work on the crankshaft in the respective working cycle is determined therefrom.

1 Claim, 4 Drawing Sheets

METHOD FOR DETERMINING THE TORQUE ON THE CRANKSHAFT OF AN INTERNAL COMBUSTION ENGINE

BACKGROUND OF THE INVENTION

The invention relates to a method for determining the torque on the crankshaft of an internal combustion engine.

The torque on the crankshaft of an internal combustion engine is determined by means of the value of the mass volumetric efficiency. To do this, the time profile of the mass volumetric efficiency itself is determined by means of an estimate. The torque is then determined in accordance with this estimate.

It is the object of the present invention to provide a method with which the torque, which is generated by an internal combustion engine, can be determined more precisely in particular in non-steady engine operating states.

SUMMARY OF THE INVENTION

In a method for determining the torque of the crankshaft of an internal combustion engine, the intake work of the cylinder in the respective working cycle during the intake period, the compression work of the cylinder in the respective working cycle during the compression period, the combustion work of the cylinder in the respective working cycle during the combustion period and the expulsion work of the cylinder in the respective working cycle during the exhaust period are determined, and the work on the crankshaft in the respective working cycle is determined therefrom.

As a result, the work applied by the engine pistons to the crankshaft can be determined in synchronism with the working cycle even under non-steady-state operating conditions.

This precise determination of the time profile of the torque provides the possibility of considerably improving the method of controlling internal combustion engines in that the torque which is available at the crankshaft can be determined precisely, and with respect to its time profile under non-steady-state operating conditions.

An exemplary embodiment of the invention is illustrated below on the basis of the accompanying drawings.

DESCRIPTION OF A PREFERRED EMBODIMENT

Figure 1:
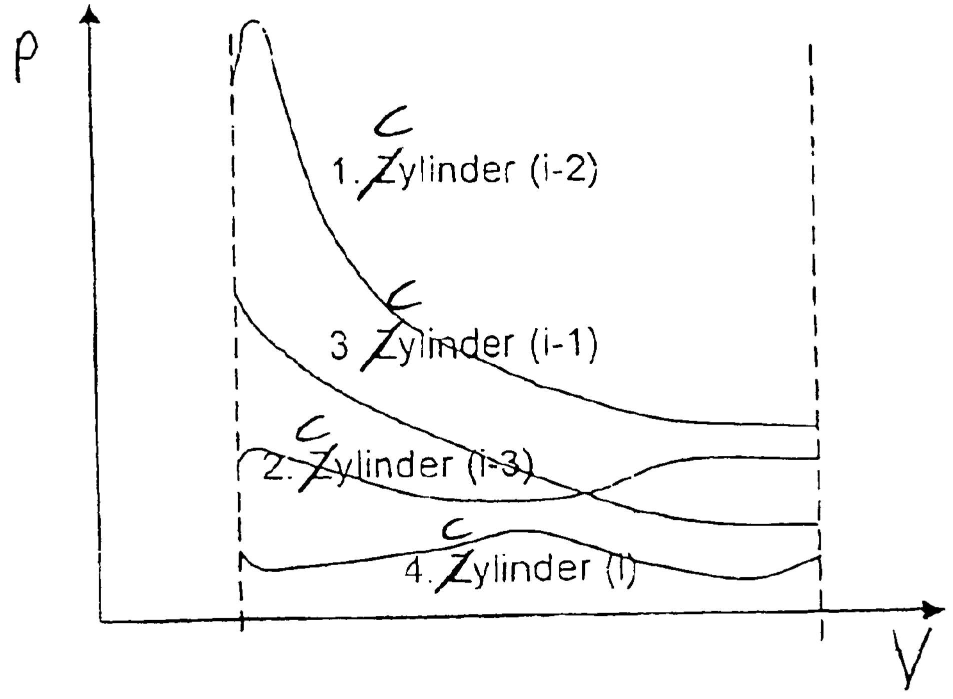
FIG. 1 shows a diagram of the cylinder pressure plotted against the displacement in a four-cylinder engine over one working cycle of the respective cylinders.

FIG. 1 shows an indicator diagram of a four-cylinder engine in which the pressure relationships in the cylinders are plotted against the displacement for one working cycle. A complete indicator diagram is passed through in each working cycle. As stated, under non-steady-state conditions, the portions of the individual cylinders involved in the indicator diagram may differ owing to different conditions with respect to the intake time, working time and expulsion time. For this reason, the respective intake, compression, combustion and expulsion work is advantageously determined individually for each working cycle.

For example, manipulated variables for virtually simultaneous settings of a precise torque can advantageously be derived therefrom. These manipulated variables can be the efficiency-influencing manipulated variables of the cylinder, which is in the working cycle at that particular time. In a direct-injecting engine or a Diesel engine, the quantity of heat can also be varied by means of the quantity of fuel supplied. The manipulated variables can be derived during the virtually simultaneous determination in such a way that it is possible to adapt the torque by influencing the manipulated variables in the next working cycle, or, under certain circumstances, even in the current working cycle, so that a precise torque can be set as quickly as possible.

Furthermore, this torque which is determined can also be made available as an input variable to other systems and control units, which, for the sake of their own functions, have to be aware of the torque output by the crankshaft.

In FIG. 1, the current working cycle is referred to by the index "i". The indices (i-1), (i-2), (i-3) relate to the respective preceding working cycles. FIG. 1 shows the part of the curve for the cylinder 4, which corresponds to the intake period. At the right-hand end of the curve, the inlet valves are closed. From knowledge of the quantity of air taken in when the inlet valves are closed, it is then possible to determine the respective working portions in the following working cycles. In particular, the compression work which is to be determined in the following working cycle is determined by the quantity or air taken in. In the subsequent working cycle, the expansion work can, for example, still be influenced by an intervention in the manipulated variables, which affect the efficiency. In a direct-injecting engine or a Diesel engine, the quantity of heat can also be varied by means of the quantity of fuel supplied. This is another possible way of intervening in order to set a specific torque. The expulsion work is also determined on the basis of the quantity supplied and the sequence of the combustion process.

This means therefore that the information on the quantities which are supplied to the individual cylinders are used during the closing of the inlet valves in order to determine subsequently the corresponding working portions of the respective cylinder in the respective working cycles.

This determination can be made by means of a model as will be explained below. However, it is also possible to determine the above by means of characteristic curves or characteristic diagrams or even by means of a charge exchange calculation.

Figure 2A:
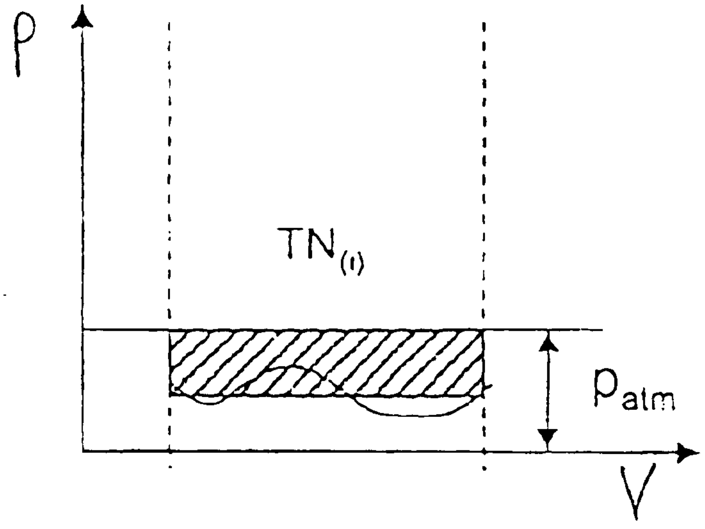
FIG. 2*a* shows a diagram of the cylinder pressure plotted against the displacement from which the intake work can be determined.

FIG. 2*a* shows a diagram in which the intake work in one working cycle $TN_{(i)}$ is explained. The pressure in the cylinder is plotted again the displacement. The atmospheric pressure (ambient pressure) is designated by $p_{atm}$. The average pressure in the intake period $p_{msaug(i)}$ is obtained as:

$$P_{(msaug(i)}=(P_{atm}-P_{saug(i)})*m+P_{msuagrest}$$

This will be explained in detail once more in conjunction with FIG. 5.

Figure 2B:
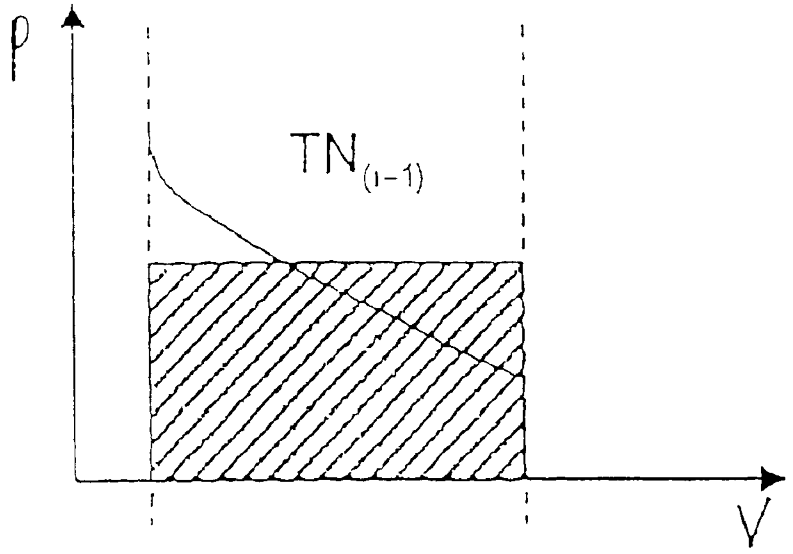
FIG. 2*b* shows a diagram of the cylinder pressure plotted against the displacement from which the compression work can be determined.

FIG. 2*b* shows a diagram in which the compression work is explained. The pressure in the cylinder is plotted again against the displacement. The average pressure in the compression period is obtained as:

$$P_{mkcomp(i-1)} = \frac{P_1 * V_1}{(K-1) * V_{Displ}} * ((V_1 / V_K)^{K-1} - 1)$$

In the overall balance, precise knowledge of the variable K is not necessary because, in the case of the combustion work, the compression work with the same K is subtracted or added again. Although this is the compression work of another cylinder, it has become apparent that inaccuracies in the variable K have a negligible influence on the difference between these compression work values.

Figure 2C:
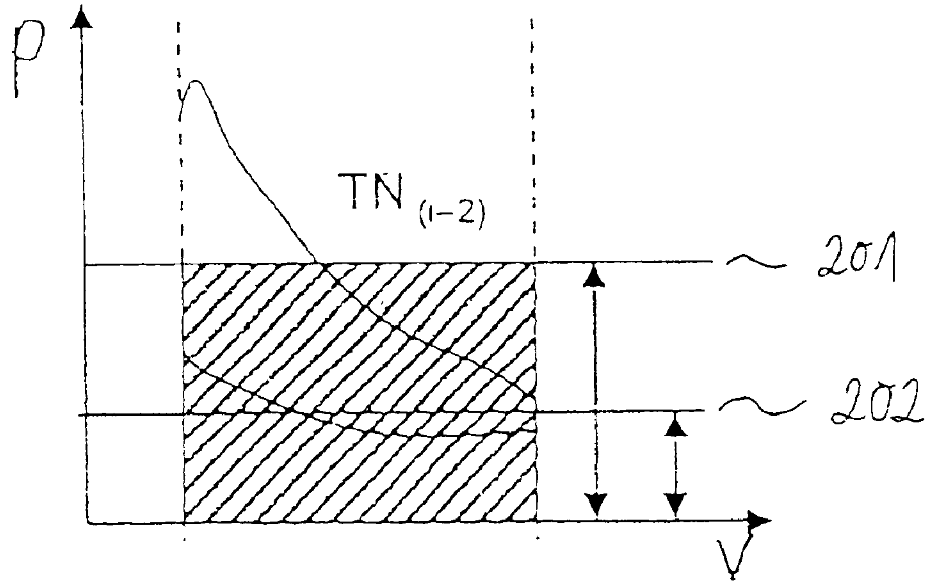
FIG. 2*c* shows a diagram of the cylinder pressure plotted against the displacement, from which the combustion work can be determined.

FIG. 2*c* shows a diagram in which the combustion work is explained. The index "i" is used to refer to the current working cycle. The pressure in the cylinder is again plotted against the displacement. The average combustion pressure $P_{mverb(i\text{-}2)}$ is obtained as:

$$P_{mverb(i\text{-}2)} = P_{mkomp(i\text{-}2)} + P_{miMD(i\text{-}2)}$$

The average induced high pressure $P_{miHD(a\text{-}2)}$ due to the combustion process can be determined as a function of the mass volumetric efficiency and the ignition time on a test bed. The area between the expansion curve and the compression curve is obtained on a test bed. In order to obtain the area under the expansion curve, the compression work must be added again.

The average combustion pressure $P_{mverb(i\text{-}2)}$ over 180° CA is designated in FIG. 2*c* by the reference numeral 201, and the average compression over 180° CA is designated in FIG. 2*c* by the reference numeral 202.

Figure 2D:
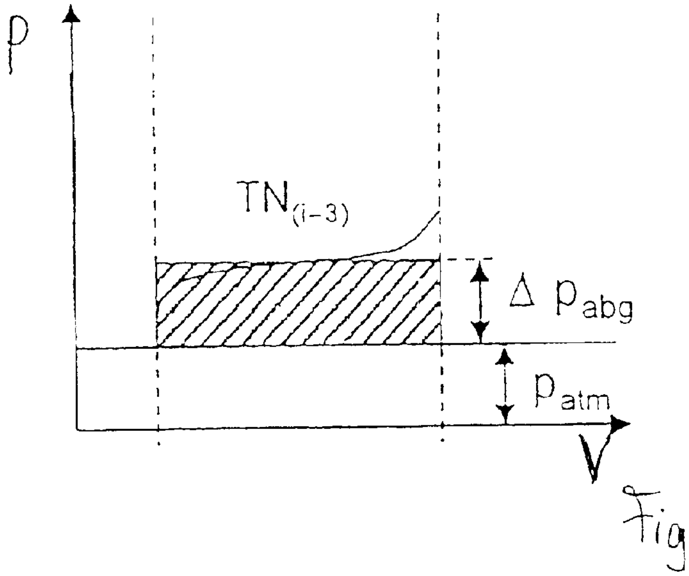
FIG. 2*d* shows a diagram of the cylinder pressure plotted against the displacement, from which the expulsion work can be determined.

FIG. 2*d* shows a diagram in which the expulsion work is explained. The pressure in the cylinder is plotted again against the displacement. The average pressure in the expulsion period $P_{maus(i\text{-}3)}$ is obtained as:

$$P_{maus(i\text{-}3)} = P_{abg} * b + P_{mausrest}$$

Here, $P_{abg}$ is the pressure in the exhaust pipe, which acts as a counter pressure with respect to the expulsion work. As will be explained later in relation to FIG. 6, the average pressure in the expulsion period is obtained from this as:

$$P_{maus(i\text{-}3} = (TL_{(i\text{-}3)})^2 * d * b + P_{mausrest}$$

The variable TL designates here the mass volumetric efficiency, and the values d and b are constants.

In the present explanation, the portions of the individual cylinders have been described by means of a model so that these portions can be represented analytically.

However, the essential feature is less the precise manner of determining the individual portions but rather the determination of these portions in synchronism with the working cycle. The portions can also be determined, for example, by means of characteristic diagrams.

FIGS. 3*a* to 3*d* show the relationships in an eight-cylinder engine. It is to be noted here that a working cycle corresponds to one rotation of the crankshaft through 90°.

Figure 3A:
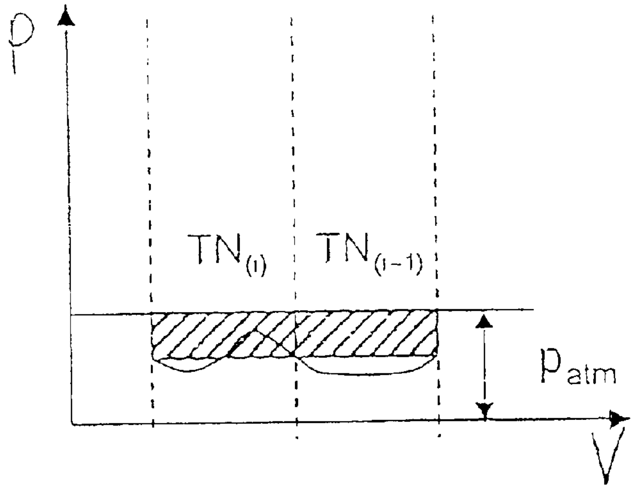
FIGS. 3*a* to 3*d* show the corresponding relationships in an eight-cylinder engine.
Figure 3B:
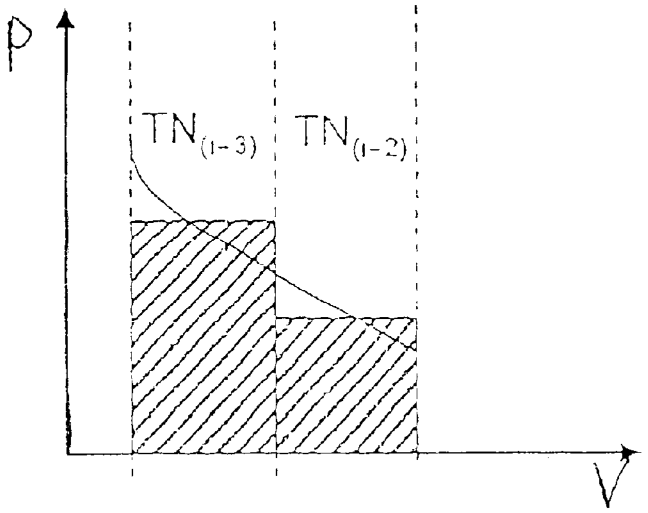
Figure 3C:
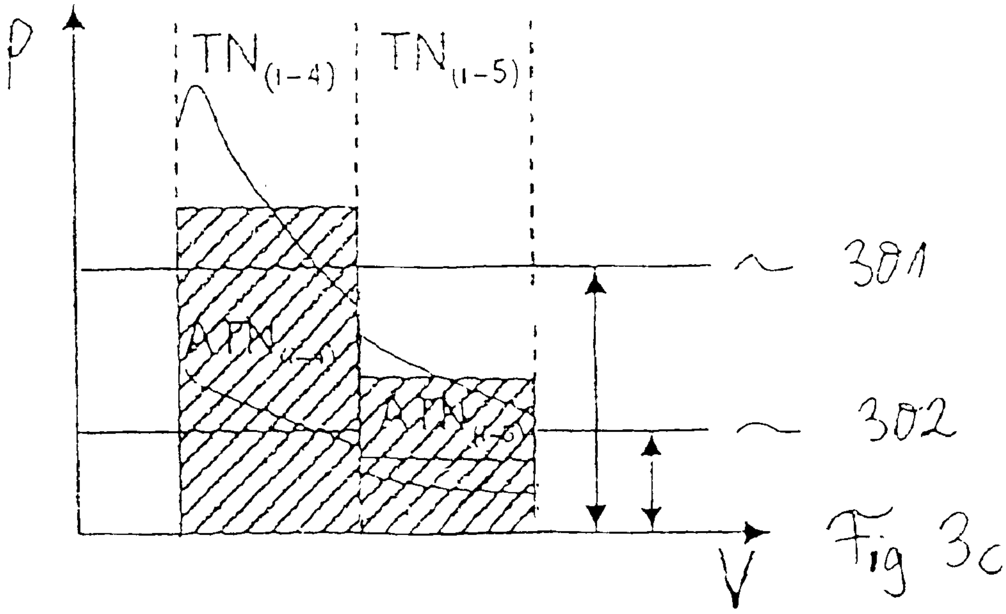
Figure 3D:
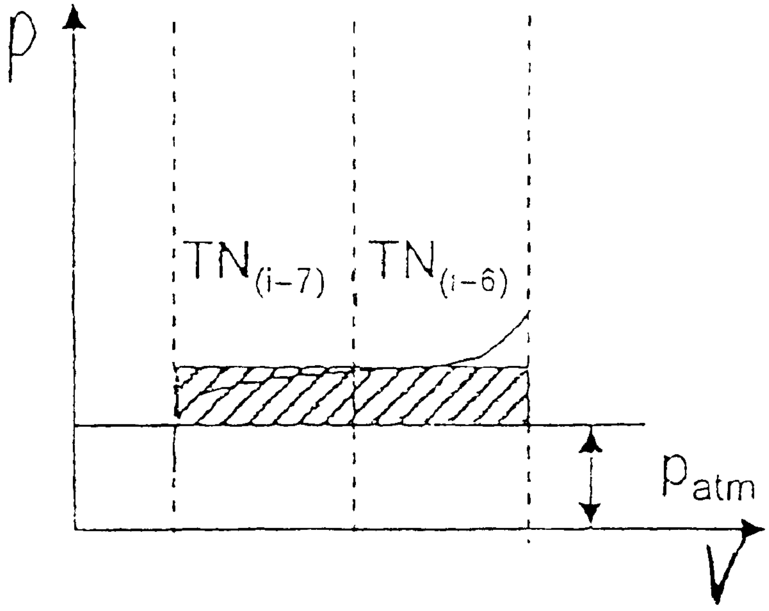

In FIG. 3*c*—in a way comparable to the relationships in FIG. 2*c*—the average combustion pressure over 180° CA is designated by the reference numeral 301, and the average compression pressure over 180° CA is designated by the reference numeral 302. The average combustion pressure is obtained as:

$$\text{Average combustion pressure} = (ATN_{(i\text{-}4)} + ATN_{(i\text{-}5)})/2$$

The variable ATN is the work averaged over the crank angle in question. In an eight cylinder engine, $ATN_{(i\text{-}4)}$ is the expansion work averaged over the first 90° crank angles for the cylinder which is at the start of the working cycle, $ATN_{(i\text{-}5)}$ is the expansion work averaged over the second 90° crank angles for the cylinder which is in the second part of the working cycle. The variable $ATN_{(i\text{-}4)}/ATN_{(i\text{-}5)}$ can be represented as a function of the center of gravity and the compression work. The hatched area in FIG. 3*c* is designated in each case by the designation "ATN".

What is claimed is:

1. A method for determining the torque on the crankshaft of an internal combustion engine comprising the steps of: determining the intake work of a cylinder in the respective working cycle in an intake period, determining the compression work of a cylinder in the respective working cycle during a compression period, determining the combustion work of the cylinder in a respective working cycle during a combustion period, determining the expulsion work of a cylinder in the respective working cycle during the exhaust period, and determining therefrom the work of the crankshaft in the respective working cycle of the engine.

* * * * *